US008774192B2

(12) United States Patent
Das et al.

(10) Patent No.: US 8,774,192 B2
(45) Date of Patent: Jul. 8, 2014

(54) METHODS SYSTEMS, AND DEVICES FOR ROBUSTNESS IMPROVEMENT IN A MOBILE AD HOC NETWORK USING REPUTATION-BASED ROUTING

(76) Inventors: Arnab Das, Washington, DC (US); Santanu Das, Monroe, CT (US)

( * ) Notice: Subject to any disclaimer, the term of this patent is extended or adjusted under 35 U.S.C. 154(b) by 0 days.

(21) Appl. No.: 13/608,738

(22) Filed: Sep. 10, 2012

(65) Prior Publication Data

US 2013/0094398 A1    Apr. 18, 2013

Related U.S. Application Data

(60) Provisional application No. 61/533,215, filed on Sep. 10, 2011.

(51) Int. Cl.
*H04L 12/28*    (2006.01)

(52) U.S. Cl.
USPC ............ 370/395.21; 370/395.32; 370/395.42; 370/400

(58) Field of Classification Search
USPC ......... 370/255, 395.2, 395.21, 395.3, 395.31, 370/395.32
See application file for complete search history.

(56) References Cited

U.S. PATENT DOCUMENTS

| | | | | |
|---|---|---|---|---|
| 4,967,345 | A * | 10/1990 | Clarke et al. | 709/241 |
| 7,155,518 | B2 * | 12/2006 | Forslow | 709/227 |
| 2006/0178156 | A1 * | 8/2006 | Kim | 455/466 |
| 2007/0280174 | A1 * | 12/2007 | Pun | 370/338 |
| 2009/0168768 | A1 * | 7/2009 | Chiabaut et al. | 370/389 |
| 2010/0054192 | A1 * | 3/2010 | Kim et al. | 370/329 |
| 2011/0164527 | A1 * | 7/2011 | Mishra et al. | 370/252 |

OTHER PUBLICATIONS

I. Broustis, G. Jakllari, T. Repantis, M. Molle, "A Comprehensive Comparison of Routing Protocols for Large-Scale Wireless MANETs," IEEE SECON, Sep. 2006, Reston.
O. Spaniol, "Routing Algorithms for Mobile Multi-Hop Ad-Hoc Networks," International Workshop NGNT, 2002, p. 10-24.
Y. Ko, N. Vaidya, "Location-Aided Routing (LAR) in Mobile Ad Hoc Networks," Proc. MobiCom, Oct. 1998, Dallas.
H. Yu, J. Rexford, E. Felten, "A Distributed Reputation Approach to Cooperative Internet Routing Protection," Proc. NPSec, Nov. 2005, Boston.
A. Das, G. Kesidis, V. Pothamsetty, "Assessing Discreet Packet-Dropping Attacks Using Nearest Neighbor and Path-Vector Attribution," IEEE Broadnets, Sep. 2007, Raleigh.
A. Srinivasan, J. Teitelbaum, J. Wu, "DRBTS: Distributed Reputation-based Beacon Trust System," IEEE Symp. on Dep., Autonomic, and Secure Computing, 2006, Indianapolis.

(Continued)

*Primary Examiner* — Alvin A Zhu
(74) *Attorney, Agent, or Firm* — Atanu Das; Techlaw LLP (57) ABSTRACT

Aspect of the present disclosure include A Mobile Ad Hoc Network (MANET) in which an intermediate relay node may engage in discreet packet-dropping practices for selfish (e.g., to conserve power) or other reasons. Each node in such a MANET has a dynamic reputation level known to all other nodes. Embodiments include improving the overall performance or robustness of such a MANET by adopting a routing strategy (e.g. routing protocol) which considers the reputation levels of intermediate relaying nodes in determining the best route from a source to a destination. Embodiments of the present disclosure also include a system for discovering a route between two nodes in a communication network. One or more nodes: (i) determine a reputation level of each neighboring node; (ii) sending a route discovery message that is addressed to the destination node to one neighboring node having a highest reputation level.

27 Claims, 3 Drawing Sheets

(56) References Cited

OTHER PUBLICATIONS

S. Ganeriwal, M.Srivastava, "Reputation-based Framework for High Integrity Sensor Networks," Proc. ACM SANS, Oct. 2004.
M. Momani, S. Challa, "Survey of Trust Models in Different Network Domains," Technical Report, Oct. 2010.
A. Pirzada, C.McDonald, "Establishing Trust in Pure Ad-hoc Networks," Proc. ACSC, Jan. 2004, Dunedin.
M. Probst, S. Kasera, "Statistical Trust Establishment in Wireless Sensor Networks," Int. Conf. on Parallel and Dist. Systems, Dec. 2007, Hsinchu.
S. Buchegger, J.Le Boudec, "Nodes Bearing Grudges: Towards Routing Security, Fairness, and Robustness in Mobile Ad Hoc Networks," Wkshp Par., Dist, and NW-Based Proc., 2002.
V. Balakrishnan, V. Varadharajan, P. Lucs, U. Tupakula "Trust Enhanced Secure Mobile Ad-hoc Network Routing," Proc. IEEE AINAW, May 2007, Niagara Falls.
A. Srinivasan, J.Teitelbaum, J. Wu, M. Cardei, H. Liang. "Reputation and Trust-based Systems for Ad Hoc and Sensor Networks," Alg/Prot for Wireless, Mob. Ad-Hoc NW, Wiley 2008.
M. Felegyhazi, L.Buttyan, J.Hubaux "Equilibrium Analysis of Packet Forwarding Strategies in Wireless Ad Hoc Networks—the Static Case," Proc. PWC, Sep. 2003.
D. West. Introduction to Graph Theory. 2001, Prentice Hall, Upper Saddle River, NJ.
Y. Rekhter, T. Li, A border gateway protocol 4 (BGP-4), Mar. 1995, in IETF RFC 1771.
T. Kim, H. Seo, "A Trust Model Using Fuzzy Logic in Wireless Sensor Network," World Academy of Science, Engineering and Technology, 2008, p. 63-66.
Z. Liu, A. Joy, R. Thompson, "A Dynamic Trust Model for Mobile Ad Hoc Networks," FTDCS, May 2004.
F. Marmol, G. Perez, "TRMSim-WSN, Trust and Reputation Models Simulator for Wireless Sensor Networks," Proc. IEEE ICC, Jun. 2009, Dresden.
Z.Yan, P. Zhang, T. Virtanen, "Trust Evaluation Based Security Solution in Ad Hoc Networks," The Seventh Nordic Workshop on Secure IT Systems, Oct. 2003, Gjovik.
J. Sen, "A Survey on Reputation and Trust-Based Systems for Wireless Communication Networks," Int. Journ. HIT Transaction on ECCN, Apr. 2006.
L. Yang, M. Jacobsen, S. Wetzel, "Discount Anonymous on Demand Routing for Mobile Ad hoc Networks," Proc. Securecom, 2006.
J. Cordasco, S. Wetzel, "An Attacker Model for MANET Routing Security," Proc. ACM WiSec, Mar. 2009, p. 87-93, Zurich.
M. Zapata, N. Asokan, "Securing Ad hoc Routing Protocols," Proc. WiSe, Sep. 2002, Atlanta.
H. Deng, W. Li, D. Agrawal, "Routing Security in Wireless Ad Hoc Networks," IEEE Communication Magazine, Oct. 2002, p. 70-75.
X. Li, M. Lyu, J. Liu, "A Trust Model Based Routing Protocol for Secure Ad Hoc Networks," Proc. IEEE Aerospace Conference, Mar. 2004.
I. Aad, J. Hubaux, E. Knightly, "Denial of Service Resilience in Ad Hoc Networks," ACM MobiCom, Sep. 2004, p. 202-215.
L. Buttyan, J. Hubaux, "Nuglets: A Virtual Currency to Stimulate Cooperation in Self-Organized Mobile Ad Hoc Networks," 2001, Technical Report, DSC/2001/001, EPFL.
J. Crowcroft, R. Gibbens, F.Kelly, S.Ostring, "Modelling Incentives for Collaboration in Mobile Ad Hoc Networks," Proc. WiOpt, 2003.
Z. Li, B. Li, "Improving Throughput in Multi-hop Wireless Networks," IEEE Trans. on Vehicular Tech., May 2006, vol. 55, No. 3, p. 762-773.
N. Salem, L. Buttyan, J. Hubaux, M. Jakobsson, "A Charging and Rewarding Scheme for Packet Forwarding in Multi-hop Cellular Networks," Proc. MobiHoc, Jun. 2003.
T. Srinivasan, V. Vijaykumar, R. Chandrasekar, "An Auction-Based Task Allocation Scheme for Power-Aware Intrusion Detection in Wireless Ad-Hoc Networks," ICWOCN, 2006.
X. Su, S. Chan, "Max-min Fair Rate Allocation in Multi-hop Wireless Ad Hoc Networks," Proc. IEEE International Conference on Mobile Ad-hoc and Sensor Systems, 2006.
Y. Xue, B. Li, K. Nahrstedt, "Optimal Resource Allocation in Wireless Ad Hoc Networks: A Price-based Approach," IEEE Trans. Mob. Comp., Apr. 2006, vol. 5, No. 4, p. 347-364.
D. Jorg, "Performance Comparison of MANET Routing Protocols in Different Network Sizes," Inst. of CS and Applied Math., Univ. of Berne, Switzerland, 2003, p. 1-31.
T. Staub, "Performance Comparison of MANET Routing Protocols in Ad-hoc and Hybrid Networks," Inst. of CS and Applied Math. Univ. of Berne, Switzerland, 2004, p. 1-40.

\* cited by examiner

METHODS SYSTEMS, AND DEVICES FOR ROBUSTNESS IMPROVEMENT IN A MOBILE AD HOC NETWORK USING REPUTATION-BASED ROUTING

CROSS-REFERENCE TO RELATED APPLICATIONS

The present application claims priority under the laws and rules of the United States, including 35 USC §120, to U.S. Provisional Patent Application No. 61/533,215 filed on Sep. 10, 2011. The contents of U.S. Provisional Patent Application No. 61/533,215 filed are herein incorporated by reference in their entirety.

BACKGROUND

In ad hoc networks, nodes engage in peer-to-peer communication without a set infrastructure and without coordination or oversight by a central authority such as an Access Point (AP). Mobile Ad Hoc Networks (MANETs) represent a specific type of ad hoc network in which the nodes are mobile. MANETs are commonly used for tactical military communications, communication for disaster relief, and communication among mobile sensors. Due to node mobility and the limited reach of the nodes, transmissions between a source and a destination in a MANET often must be via multiple intermediate nodes. In these scenarios, the nodes normally behave cooperatively for the overall integrity of the network.

However, not all intermediate nodes can be expected to behave reliably at all times. Their misbehavior could be due to their: (a) having limited resources (e.g., power) and thus being selfish to conserve resources, (b) having sustained a permanent or transient fault condition, or (c) being malicious.

A number of studies have dealt with the vulnerability of wireless networks and the concepts of "reputation" and "trust" have been used to model and improve their reliability. Reputation is the opinion of one entity (e.g., a node) about another. Trust, on the other hand, is the expectation of one entity about the actions of another.

There are several approaches to establishing trust and reputation models in wireless networks. One example is a distributed approach that establishes reputation-based trust among nodes in order to identify malfunctioning and/or malicious nodes. It has also been demonstrated through analysis and simulation that the packet-dropping behavior of a node (i.e., its reputation) is revealed through nearest neighbor attribution assessments in a wide variety of scenarios assuming enough node mobility in the MANET. In other words, whenever a packet fails to reach its destination in a multi-hop MANET, the failure or misbehavior can be attributed to the source's nearest neighbor on the path from the source to the destination. Assuming enough node mobility in the MANET, each node is able to determine and continuously update its view of the reputation of every other node in the MANET.

Having a trust or reputation model allows for devising routing schemes to improve security and reliability of MANETs. Examples have described a trust model based routing protocol to improve security of MANETs. One such a protocol, called Trusted AODV (TAODV), improves system performance mainly by verifying trust certificates at every routing step. In such a scheme, a node which behaves maliciously may eventually be detected and denied access to the resources of the network. Another extends Dynamic Source Routing protocol (DSR) making it possible to detect and isolate misbehaving nodes, and thus making it unattractive to deny cooperation. A further scheme identifies benign and malicious behaviors of nodes capturing evidence from direct interaction with neighbors. It then applies this evidence of "trust" to enhance the security of communications depending on decision policies, such as whether to send a packet to or forward a packet on behalf of other nodes.

SUMMARY

The overriding concern of existing schemes is related to trust evaluation of nodes in a MANET, and then using the trust model to improve reliability and security of routing. In contrast, embodiments in the present disclosure utilize the reputation information associated with each node to improve the overall performance or robustness of packet transfer in a MANET. Embodiments of the present disclosure describe a scheme based on a modification of the Ad Hoc On-Demand Distance Vector (AODV) routing protocol. The scheme, called Robust AODV (RAODV), relies on a routing strategy which considers the reputation of intermediate relaying nodes in determining the best route from the source to the destination. Embodiments relate to mostly nodes which misbehave either for "selfish" reasons or have sustained a transient or permanent fault.

Embodiments of the present disclosure include a method for discovering a route between two nodes in a communication network. Such a method may include a node determining a reputation level of each of its neighboring nodes. Further, the node may sending a route discovery message to one neighboring node having a highest reputation level. However, if two or more neighboring nodes have the same highest reputation level, then the node arbitrarily sends the route discovery message to one of the two or more neighboring nodes. In another embodiment, the sending of the route discovery message to one neighboring node may be based in addition to, or instead of, a reputation threshold. For example, neighboring nodes may have a certain reputation level based on the delay in processing packets. However, the packets to traverse the neighboring nodes may be for a Voice over IP (VoIP) application. The reputation level based on delay may not be high enough to support such a VoIP application and thus no route discovery message is sent or the protocol supporting the sending of the discovery message times out. Further, the node may determine the reputation threshold based on one or more network characteristics and neighbor node characteristics.

In addition, the method may include sending the route discovery message to a neighboring node based on using a robust ad-hoc on-demand distance vector (RAODV) protocol. Alternatively, the method may include the sending the route discovery message to a neighboring node based on using a modification of a protocol using reputation level of neighboring nodes. Further, the protocol can include, but is not limited to, ad-hoc on demand distance vector protocol (AODV), dynamic source routing protocol (DSR), Internet Protocol (IP), open shortest path first (OSPF), routing protocol, Destination Sequenced Distance Vector Protocol (DSDV), Location-Aided Routing (LAR) and any combination thereof.

The method may also include that the reputation level of a neighboring node is based on one or more node characteristics. Node characteristics may include but are not limited to, packet loss rate, packet dropping rate, buffer overflow, traffic congestion, traffic loading, power consumption, memory capacity, bandwidth capacity, processor capacity, throughput, wireless link quality, packet forwarding rate, and any combination thereof. Network characteristics may include, but are not limited to, network size (e.g. number of nodes in the network, etc.), mean network throughput, delay, latency, mean packet size, bit error rate, jitter, and any combination thereof. Further, the communication network may of one or more of the following types, that include, but are not limited to, a mobile ad-hoc network, a wireless network, a cellular network, an Internet Protocol-based network, wireless sensor network, wireless mesh network, wireline network, fixed network and any combination thereof.

Embodiments of the present disclosure also include a system for discovering a route between two nodes in a communication network. The system includes a source node, a destination node, and one or more intermediate nodes coupled to the source node and the destination node through the communication network. Further, the source node and the one or more intermediate nodes: (i) determine a reputation level of each neighboring node; (ii) sending a route discovery message that is addressed to the destination node to one neighboring node having a highest reputation level. Further, if two or more neighboring nodes have the highest reputation level, then the source node and the one or more intermediate nodes arbitrarily sends the route discovery message to one of the two or more neighboring nodes. Alternatively, or in addition to, the sending of the route discovery message to one neighboring node may be based on a reputation threshold. Also, the source node and one or more intermediate nodes may determine the reputation threshold based on one or more network characteristics and neighbor node characteristics as mentioned in the present disclosure.

Further, the sending the route discovery message to one neighboring node is based on using a robust ad-hoc on-demand distance vector (ROADV) protocol. Alternatively, or in addition to, the sending the route discovery message to a neighboring node may be based on using a modification of a protocol using reputation level of neighboring nodes. The protocol may be but is not limited to, ad-hoc on demand distance vector protocol (AODV), dynamic source routing protocol (DSR), Internet Protocol (IP), open shortest path first (OSPF), routing protocol, Destination Sequenced Distance Vector Protocol (DSDV), Location-Aided Routing (LAR) and any combination thereof. In addition, the reputation level of a neighboring node is based on one or more node characteristics. Further, the node characteristics, network characteristics, and the communication networks may be any as disclosed in the present application.

Embodiments of the present disclosure may also include a node for discovering a route between two nodes in a communication network. The node may include a storage device, one or more communication interfaces coupled the communication network, a processor coupled to the one or more communication interfaces and the storage device. Further, the processor may implement one or more software applications and/or hardware components that (i) determines a reputation level of each neighboring node; (ii) sends a route discovery message that is addressed to the destination node to one neighboring node having a highest reputation level. If two or more neighboring nodes have the highest reputation level, then the node arbitrarily sends the route discovery message to one of the two or more neighboring nodes. In addition, or in the alternative, the sending of the route discovery message to one neighboring node may be based on a reputation threshold. The node using the processor and/or one or more software applications determines the reputation threshold based on one or more network characteristics and neighbor node characteristics as mentioned in the present disclosure.

Further, the node using the processor and/or one or more software applications sends a route discovery message to one neighboring node is based on using a robust ad-hoc on-demand distance vector (RAODV) protocol. In addition, or in the alternative, the sending the route discovery message to a neighboring node may be based on using a modification of a protocol using reputation level of neighboring nodes. The protocol may include, but is not limited to, ad-hoc on demand distance vector protocol (AODV), dynamic source routing protocol (DSR), Internet Protocol (IP), open shortest path first (OSPF), routing protocol, Destination Sequenced Distance Vector Protocol (DSDV), Location-Aided Routing (LAR) and any combination thereof.

Also, the reputation level of a neighboring node may be based on one or more neighbor node characteristics. Further, the node characteristics, network characteristics, and the communication networks may be any as disclosed in the present application.

BRIEF DESCRIPTION OF THE SEVERAL VIEWS OF THE DRAWINGS

The accompanying drawings, which are incorporated in and constitute part of this specification, illustrate embodiments of the invention and together with the description serve to explain the principles of the present disclosure. The embodiments illustrated herein are presently preferred, it being understood, however, that the invention is not limited to the precise arrangements and instrumentalities shown, wherein.

DETAILED DESCRIPTION

The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

There are several routing protocols implemented for MANET applications. Such examples are Ad Hoc On-Demand Distance Vector Routing (AODV), Dynamic Source Routing (DSR), Destination Sequenced Distance Vector Protocol (DSDV), Location-Aided Routing (LAR), etc. None of these routing protocols indirectly or directly "ranks" a node based on its past activity, past actions, or reputation. As such, none is directly usable for robustness improvement using reputation-based routing.

For deciding the best route, embodiments of the present disclosure use a mechanism based on the modification of the Ad Hoc On-Demand Distance Vector (AODV) routing protocol. The reason for choosing AODV has to do with its low routing overhead compared to the previously mentioned routing protocols and its effective performance even in large networks. As opposed to the AODV scheme, which uses a broadcast mechanism for route discovery, the scheme in the embodiments, which may be called Robust AODV (RAODV), uses a selective broadcast mechanism whereby it considers the reputation of neighboring nodes to determine the node(s) to which the route discovery packet should be sent. For such a robustness improvement scheme, each node has a dynamic reputation level value known by all other nodes. The reputation levels are updated continuously based on reports from threat detection tools or other schemes and these reports are propagated throughout the network using a known mechanism such as those disclosed in the paper "Assessing discreet packet dropping attacks using nearest-neighbor and path-vector attribution" by A. Das, G. Kesidis, and V. Pothamsetty In IEEE BROADNETS, Raleigh, September 2007 which is incorporated by reference in its entirety. An example of designating reputation levels could be as shown in Table I.

TABLE I

Example Reputation Level

| Reputation Value | Meaning |
|---|---|
| 1 | Highest |
| 2 | High |
| 3 | Medium |
| 4 | Low |
| 5 | Lowest |

Each source node may utilize these reputation values to ensure that it can achieve the most reliable packet-relaying service to a destination node. To ensure that a route with the best possible packet-relaying performance is chosen, embodiments model the MANET nodes and the links interconnecting all of the node pairs at any given instant as a set of vertices and edges of a weighted graph, where the weight of the link between Node i and Node j is based on the reputation of j, if j is relaying packets originating from i.

Figure 1:
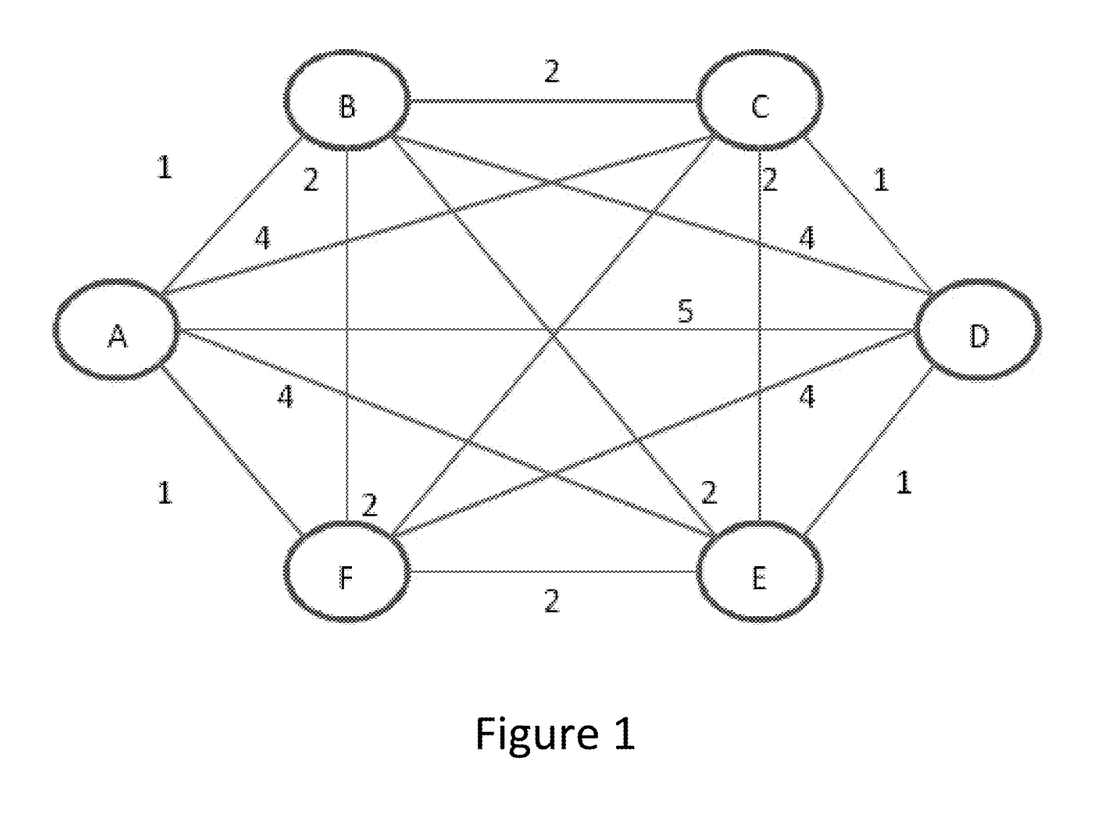
FIG. 1 shows an exemplary MANET.

FIG. 1 shows an exemplary six-node MANET with Nodes A through F and their locations at any given instant. Nodes B and F are the nearest neighbors to Node A at that instant. In FIG. 1, the weight 1 against the link interconnecting Node A to Node B signifies that B has a reputation of 1, lower weights representing better reputations. If a packet has to be forwarded from Node A to Node E, the route could be through F, where F is a relaying node, or the packet could be relayed through D as a relaying node. There are other possible routes such as A to B, B to C, C to D, and D to E. In this example, the route through F is one of the best routes as the sum of the weights (sum of reputations) is 3, while the route through D, for example, has a weight of 6, signifying a worse (less reputable) route.

The topology in FIG. 1 is simple and thus the best route from a Node i to Node j can be determined using simple observation. A general solution uses an algorithm that finds a route from the source node to the destination node using links of the highest reputation. Embodiments use a mechanism based on a modification of the Ad Hoc On-Demand Distance Vector routing protocol for deciding the best route from a source to its destination.

The AODV protocol creates routes on an on-demand basis as opposed to maintaining a complete list of routes for each source-destination pair. Thus, AODV is classified as an on-demand route acquisition scheme. In AODV, a destination node initiates a path discovery process by broadcasting a route request message (RREQ) to all of its neighbors, which in turn broadcast the message to their neighbors and so on. The forwarding process is continued until the destination node is reached, or until an intermediate node knows a route to the destination node that is new enough. To ensure a loop-free route configuration with the most recent route information, each node maintains two counters: sequence number counter and broadcast_id counter. The broadcast_id counter and the address of the source node uniquely identify a RREQ message, the broadcast_id counter being incremented for every RREQ the source node initiates.

An intermediate node can receive multiple copies of the same route request broadcast from various neighbors. If a node has already received a RREQ with the same source address and the broadcast_id counter value, it will discard the packet without broadcasting it further. When an intermediate node forwards the RREQ message, it records the address of the neighbor from which it receives the first copy of the broadcast packets. Thus, the reverse path from all nodes back to the source is being built automatically. The RREQ packet contains two sequence numbers: the source sequence number and the last destination sequence number known to the source.

When the route request broadcast reaches the destination or an intermediate node with a fresh enough route, the node responds by sending a unicast route reply packet (RREP) back to the node from which it received the RREQ. Thus, the packet is sent back through the reverse path built during broadcast forwarding. A route is considered fresh enough if the intermediate node's route to the destination node has a destination sequence number which is equal to or greater than the one contained in the RREQ packet. As the RREP packet is sent back to the source, every intermediate node along this path adds a forward route entry to its routing table. The forward route is set active for some time indicated by a route timer entry, the default value of the route timer usually being 3000 milliseconds. If the route is no longer used, it will be deleted after the specified amount of time. Since the RREP packet is always sent back through the reverse path established by the route request, the AODV protocol only supports symmetric links.

Figure 2:
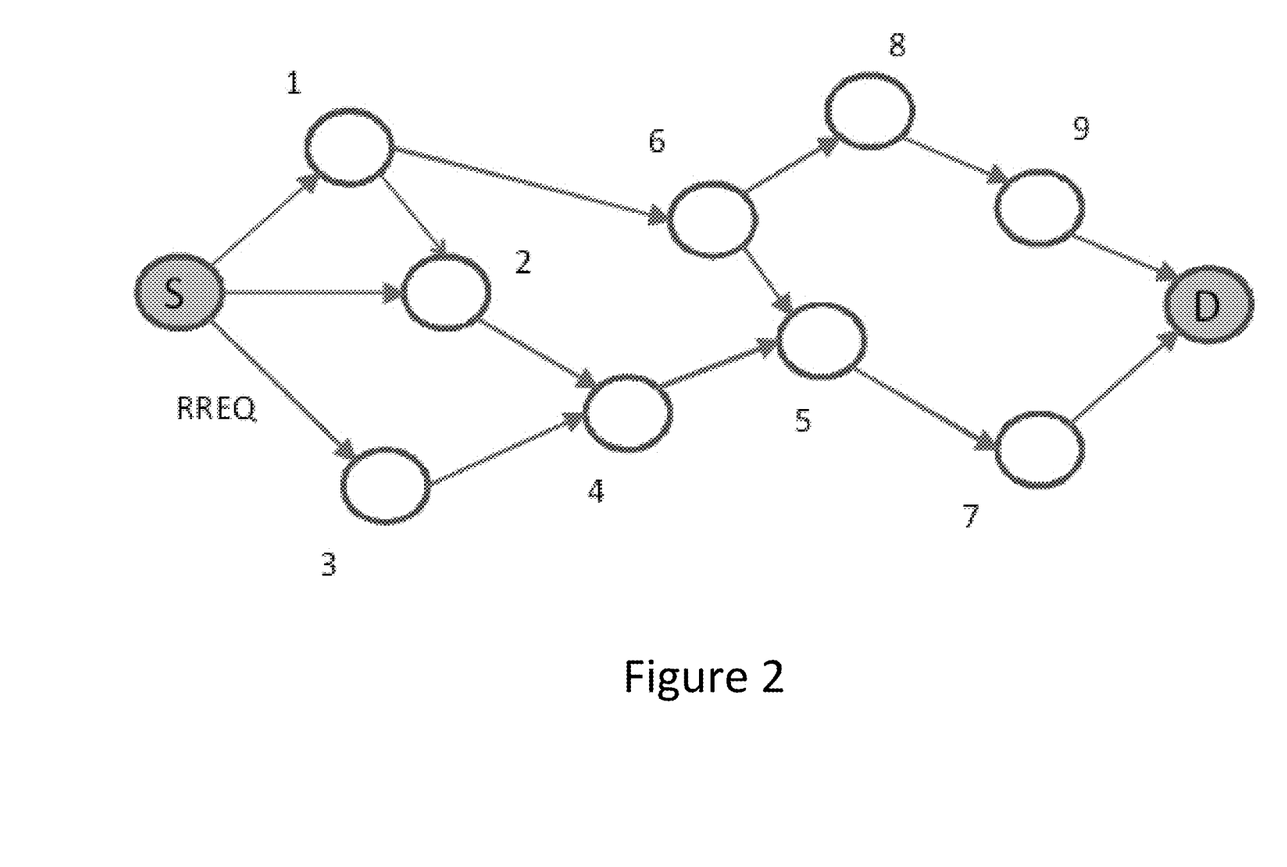
FIG. 2 shows an exemplary path discovery process in an exemplary MANET.
Figure 3:
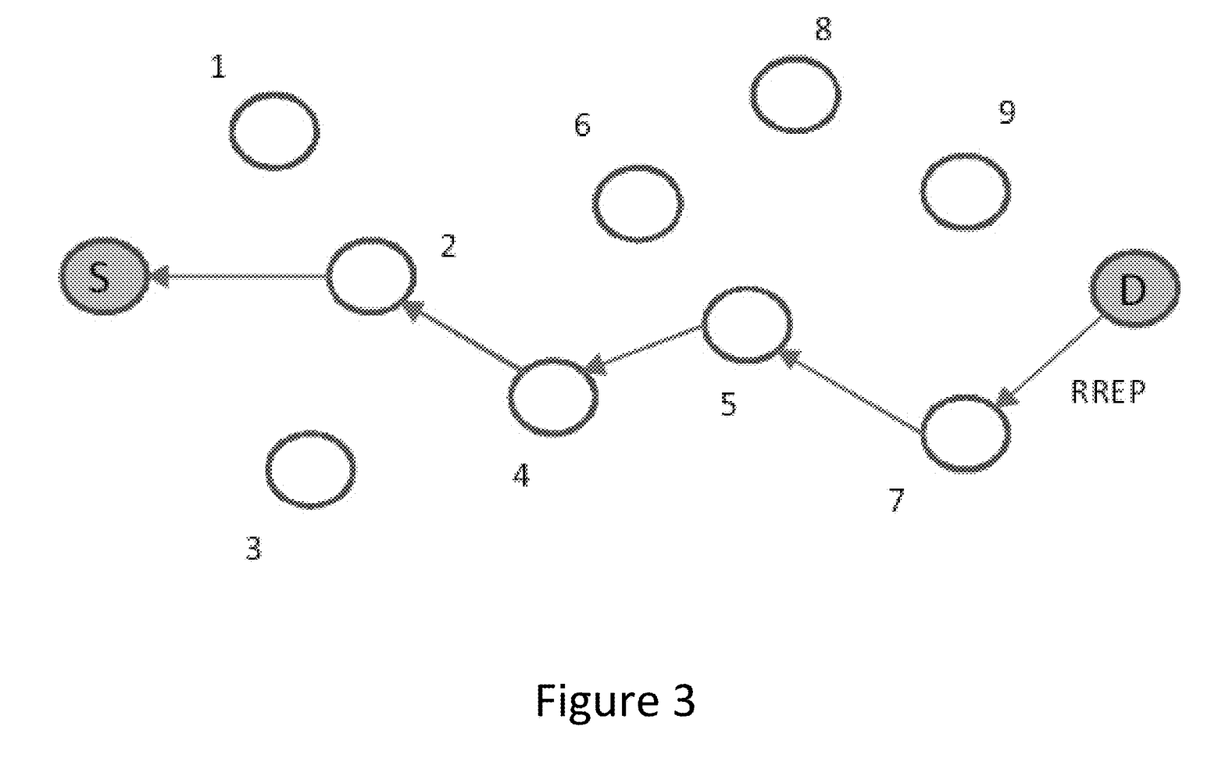
FIG. 3 shows an exemplary path reply route after implementing the RAODV.

FIG. 2 illustrates an example of the AODV path discovery process and FIG. 3 illustrates the propagation of the RREP packet through the chosen route. The Robust AODV scheme (RAODV) in the embodiments of the present disclosure takes into account the reputation of nodes in the path discovery process. A RREQ message is sent by the source only to the node(s) which has the highest reputation instead of broadcasting the message to all of its neighbors, if there is a choice. The forwarding process is continued in the same fashion with an intermediate node always forwarding RREQ messages to the neighbor(s) which has the best reputation.

Every node is assumed to maintain, as in AODV, two counters: sequence number counter and broadcast_id counter. If a node has already received a RREQ with the same source address and broadcast_id value, it will discard the packet without broadcasting it further. Unlike the AODV scheme, the path search terminates only when the RREQ packet reaches the intended destination, even if in the path discovery process an intermediate node with a fresh path to the destination is reached.

This scheme is "greedy" in the sense that each node optimizes the route from source to destination on a link-by-link basis. Embodiments implement and generate a route with a better combination of reputations than AODV.

It is possible that this scheme will not generate a valid route if an intermediate node chosen during the route discovery process is not able to reach the next node as the next node could be out of range. In this case, the route discovery process will time out. In the Robust AODV protocol, upon route discovery timeout, the source node will either (a) initiate a new route discovery process using the regular AODV mechanism or (b) re-initiate the route discovery process using the RAODV mechanism as the topology of the MANET could have changed in the meantime. Whether approach (a) or approach (b) above is used is an implementation choice. A special field in the RREQ message could be used to designate whether a regular AODV scheme or the ROADV, which uses the reputation of intermediate nodes during the route discovery process, should be used for propagating RREQ messages. FIG. 3 shows the path reply route after implementing the RAODV.

A simulation model of the RAODV mechanism compares its effectiveness vis-a-vis the regular AODV protocol. The model assumes a 10-node MANET in which the mobility of all the nodes are confined within an area of 20 units by 20 units. The model creates the instantaneous physical topology of the network of 10 nodes randomly and the reputations of the different nodes are also assigned in a random manner. Thus, for every mobility instance of the MANET, there is a random placement of 10 nodes within the bounded 20 by 20 area, and each node has a reputation randomly assigned.

The program has the capability of simulating (a) the regular AODV protocol for route discovery and (b) the RAODV scheme. The program defines a set of neighbors for every node based on a specified communication range. Referring to FIG. 2, Node 1, 2, and 3 are neighbors to the source node, assuming that all three nodes are within the communication range of the source node. Similarly, for Node 4, Node 5 is its only neighbor (but not Nodes 6 or 7) as Node 5 is the only node within Node 4's communication range.

For the RAODV scheme, the source node in FIG. 2 sends an RREQ message to only Node 1, assuming Node 1 has a better reputation than Nodes 2 and 3. Node 1 in turn sends an RREQ to Node 6, assuming Node 6 has a better reputation than Node 2. Node 6 has a choice of sending an RREQ to either Node 5 or Node 8, and assuming Node 5 has higher reputation, the RREQ will be sent to Node 5. Ultimately, the RREQ would reach the destination node via Node 7. In the model, the route discovery process terminated successfully only when the RREQ reached the destination.

In the example of FIG. 2, each and every node is reachable by its neighbors based on the specified range of the communication capability of every MANET node. The model can create any number of mobility instances. For comparison purposes, the simulations were run using three different communication capabilities of the nodes: (a) a range of ¼ of the diagonal distance of the 20×20 square region, (b) a range of ⅓ of the diagonal distance of the 20×20 square region, and (c) a range of ½ of the diagonal distance of the 20×20 square region. These choices are arbitrary and the model of course can accept any distance as the specified range. The longer the range, the greater is the probability that no single node can be completely isolated from the rest of the nodes in the MANET.

Table II shows the comparison of the effectiveness of the RAODV vis-a-vis the regular AODV protocol for 100 simulation runs (mobility instances) based on the three different communication ranges possible for each node in the MANET. As can be seen, RAODV's performance is comparable to that of the AODV protocol in terms of its ability to determine a route between a source and a destination. In fact, when the node transmission range is high (say ½ of the diagonal distance of the bounded square area), the RAODV performs as well as the AODV scheme. The reason is that the longer range creates a more strongly connected mesh network than when the range is lower.

A possible concern related to RAODV could be that the nodes with higher reputation levels might be overused. The model was used to address this concern by forcing one of the nodes to be viewed as the most "reputable" node by every other node in the simulation runs. Table III shows the result of 10,000 such simulation runs. The first column in Table III is the same as that in Table II. The second column of Table III gives the percentage of iterations using RAODV resulted in successful route discovery. This column is the same as the last column in Table II. The third column of Table III represents the percentage of iterations using RAODV where the connection was a direct one between the source and destination as the destination happened to be in the communication range of the source, thus not requiring the usage of the most reputable node. Lastly, the fourth column represents the percentage of usage of the most reputable node in those iterations which required multi-hop connections. Column IV shows that the usage of the most reputable node increases as the communication range of the nodes increases. This is intuitively obvious as with higher range a source has greater chance of using the most reputable node as one of the intermediate nodes in its route to the destination.

The high level usage of more reputable nodes is not an issue if the node usage does not result in depletion of its resources, as long as the node usage level is not extremely high. If the usage of a node results in depletion of resources, the particular node would start dropping packets after some elapsed time when its resource level is so depleted that its packet-forwarding performance is affected. This has a self-balancing effect as the reputation of that node will get lowered resulting in that node not being used that often.

TABLE II

Comparison of Route Discovery Performance AODV vs. ROADV

| Range | AODV | RAODV |
|---|---|---|
| ¼ Diagonal Length | 59% | 51% |
| ⅓ Diagonal Length | 95% | 90% |
| ½ Diagonal Length | 100% | 100% |

TABLE III

Utilization of the Most Reputable Node

| Range | RAODV Route Discovery Performance | Single Hop Percentage | Usage of Highest Reputation Node in Multi-Hop Routes |
|---|---|---|---|
| ⅕ Diagonal Length | 32% | 19% | 30% |
| ¼ Diagonal Length | 52% | 28% | 47% |
| ⅓ Diagonal Length | 82% | 45% | 59% |
| ½ Diagonal Length | 99% | 75% | 70% |

While some embodiments have been to devise a routing strategy for robustness improvement considering the reputation levels of the nodes, the strategy is equally applicable when instead of reputation levels, we consider the traffic loading levels of the nodes of a MANET. In fact, our mechanism can combine both the reputation level and the traffic loading level information together. For instance, when a node sends its RREQ packets, if it has a choice of selecting two nodes of equal reputation, it can break the tie by choosing the node which is more lightly loaded. This variation of the scheme would ensure that a packet is routed, when possible, through those nodes which are less loaded.

Embodiments of the present disclosure also include applying Robust AODV or similar modification of other protocols in non ad-hoc networks as well as fixed networks. Other embodiments of the disclosure may include communication networks wherein optimization of power consumption or traffic loading of nodes is the objective such as in wireless sensor networks and Internet Protocol-based networks. In such networks, power consumption or traffic loading of neighboring nodes are used in calculating the reputation level of nodes. Also, other types of communication networks known in the art may also use embodiments of the present disclosure including the Robust AODV.

Although specific embodiments of the present disclosure have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

The foregoing is illustrative only and is not intended to be in any way limiting. Reference is made to the accompanying drawings, which form a part hereof. In the drawings, similar symbols typically identify similar components, unless context dictates otherwise.

Note that the functional blocks, methods, devices and systems described in the present disclosure may be integrated or divided into different combination of systems, devices, and functional blocks as would be known to those skilled in the art.

In general, it should be understood that the circuits described herein may be implemented in hardware using integrated circuit technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. A method for sending data packets from any source node to any destination node in a communication network having a plurality of nodes, the method comprising:
   (a) measuring recent packet delivery performance of each node in the communication network by every other node;
   (b) determining reputation level of each node by every other node based on the measured recent packet delivery performance wherein the measuring of recent packet delivery performance is based on one or more node characteristics;
   (c) sending a route discovery message from a source node to a destination node through a neighboring node having a highest reputation level;
   (d) sending the route discovery message by each intermediate node between the source node and the destination node to the neighboring node that has the highest reputation level until the route discovery message is received by the destination node resulting in determining a set of highest reputation level intermediate nodes between the source node and destination node;
   (e) sending data packets from the source node to the destination node through the determined one or more intermediate nodes of highest reputation level.

2. The method of claim 1, wherein if two or more neighboring nodes have equal, highest reputation level, then the node arbitrarily sends the route discovery message to one of the two or more neighboring nodes.

3. The method of claim 1, wherein the sending of the route discovery message to one neighboring node is based on a reputation threshold.

4. The method of claim 3, further comprising determining the reputation threshold for a node based on one or more node characteristics.

5. The method of claim 1, wherein the sending the route discovery message to a neighboring node is based on using a modification of a protocol that uses route discovery message to be sent from the source node to the destination node to determine the intermediate nodes for relaying data packets from the source node to the destination node.

6. The method of claim 5, wherein the protocol is selected from the group consisting of ad-hoc on demand distance vector protocol (AODV), dynamic source routing protocol (DSR), spanning tree based routing protocol, Destination Sequenced Distance Vector Protocol (DSDV), Location-Aided Routing (LAR) and any combination thereof.

7. The method of claim 1, wherein the one or more node characteristics of recent packet delivery performance is selected from the group consisting of recent packet loss rate, recent packet dropping rate, recent buffer overflow rate, recent bit error rate, recent traffic loading, recent power consumption, recent memory capacity, recent quality associated with outgoing wireless links, recent packet forwarding rate, recent residual energy level, and any combination thereof.

8. The method of claim 1, wherein the measuring of recent packet delivery performance is based on one or more network characteristics wherein the one or more network characteristics is selected from the group consisting of network size requirement, mean network throughput requirement, delay requirement, latency requirement, mean packet size, bit error rate requirement, jitter characteristics, and any combination thereof.

9. The method of claim 1, wherein the communication network is selected from the group consisting of a mobile ad-hoc network, a wireless network, a cellular network, an Internet Protocol-based network, wireless sensor network, wireless mesh network, wireline network, WiFi network, fixed network and any combination thereof.

10. A system for sending data packets from any source node to any destination node in a communication network having a plurality of nodes, the system comprising:
    a source node;
    a destination node;
    one or more intermediate nodes coupled to the source node and the destination node through the communication network;
    wherein: (a) each node measures recent packet delivery performance of every other node in the communication network; (b) each node determines reputation level of every other node based on the measured recent packet delivery performance wherein the measuring of recent packet delivery performance is based on one or more node characteristics; (c) each node sends a route discovery message to the destination node through a neighboring node having highest reputation level wherein sending of the route discovery message is repeated by each intermediate node between the source node and the destination node to the a neighboring node that has the highest reputation level until the route discovery message is received by the destination node resulting in determining a set of highest reputation level intermediate nodes between the source node and destination node; (d) each node sends data packets to the destination node through the determined one or more intermediate nodes of highest reputation level.

11. The system of claim 10, wherein if two or more neighboring nodes have equal, highest reputation level, then the source node and the one or more intermediate nodes arbitrarily sends the route discovery message to one of the two or more neighboring nodes.

12. The system of claim 10, wherein sending of the route discovery message to one neighboring node is based on a reputation threshold.

13. The system of claim 12, wherein determining the reputation threshold for a node is based on one or more node characteristics.

14. The system of claim 10, wherein sending the route discovery message to a neighboring node is based on using a modification of a protocol that uses route discovery message to be sent from the source node to the destination node to determine the intermediate nodes for relaying data packets from the source node to the destination node.

15. The system of claim 14, wherein the protocol is selected from the group consisting of ad-hoc on demand distance vector protocol (AODV), dynamic source routing protocol (DSR), spanning tree based routing protocol, Destination Sequenced Distance Vector Protocol (DSDV), Location-Aided Routing (LAR) and any combination thereof.

16. The system of claim 10, wherein the one or more node characteristics of recent packet delivery performance is selected from the group consisting of recent packet loss rate, recent packet dropping rate, recent buffer overflow rate, recent bit error rate, recent traffic loading, recent power consumption, recent memory capacity, recent quality associated with outgoing wireless links, recent packet forwarding rate, recent residual energy level, and any combination thereof.

17. The system of claim 10, wherein the measuring of recent packet delivery performance is based on one or more network characteristics wherein the one or more network characteristics is selected from the group consisting of network size requirement, mean network throughput requirement, delay requirement, latency requirement, mean packet size, bit error rate requirement, jitter characteristics, and any combination thereof.

18. The system of claim 10, wherein the communication network is selected from the group consisting of a mobile ad-hoc network, a wireless network, a cellular network, an Internet Protocol-based network, wireless sensor network, wireless mesh network, wireline network, WiFi network, fixed network and any combination thereof.

19. A node device for sending data packets from any source node to any destination node in a communication network, the node device comprising:
  a storage device;
  one or more communication interfaces coupled to the communication network;
  a processor coupled to the one or more communication interfaces and the storage device;
  wherein the node using the processor: (a) measures recent packet delivery performance of each node in the communication network; (b) determines reputation level of each node based on the measured recent packet delivery performance wherein the measuring of recent packet delivery performance is based on one or more node characteristics; (c) sends a route discovery message to a destination node through a neighboring node having highest reputation level and a set of highest reputation level intermediate nodes; (d) sends data packet to the destination node through the determined neighboring node and one or more intermediate nodes of highest reputation level.

20. The node device of claim 19, wherein if two or more neighboring nodes have equal, highest reputation level, then the node arbitrarily sends the route discovery message to one of the two or more neighboring nodes.

21. The node device of claim 19, wherein sending of the route discovery message to one neighboring node is based on a reputation threshold.

22. The node device of claim 21, wherein the node using the processor determines the reputation threshold based on one or more node characteristics.

23. The node device of claim 19, wherein sending the route discovery message to a neighboring node is based on using a modification of a protocol that uses route discovery message to be sent from the source node to the destination node to determine the intermediate nodes for relaying data packets from any source node to any destination node.

24. The node device of claim 23, wherein the protocol is selected from the group consisting of ad-hoc on demand distance vector protocol (AODV), dynamic source routing protocol (DSR), spanning tree based routing protocol, Destination Sequenced Distance Vector Protocol (DSDV), Location-Aided Routing (LAR) and any combination thereof.

25. The node device of claim 19, wherein the one or more node characteristics of recent packet delivery performance is selected from the group consisting of recent packet loss rate, recent packet dropping rate, recent bit error rate, recent buffer overflow rate, recent traffic loading, recent power consumption, recent memory capacity, recent quality associated with outgoing wireless links, recent packet forwarding rate, recent residual energy level, and any combination thereof.

26. The node device of claim 19, wherein the measuring of recent packet delivery performance is based on one or more network characteristics wherein the one or more network characteristics is selected from the group consisting of network size requirement, mean network throughput requirement, delay requirement, latency requirement, mean packet size, bit error rate requirement, jitter characteristics, and any combination thereof.

27. The node device of claim 19, wherein the communication network is selected from the group consisting of a mobile ad-hoc network, a wireless network, a cellular network, an Internet Protocol-based network, wireless sensor network, wireless mesh network, wireline network, WiFi network, fixed network and any combination thereof.

* * * * *